US010910805B2

(12) United States Patent
Joshi et al.

(10) Patent No.: US 10,910,805 B2
(45) Date of Patent: Feb. 2, 2021

(54) ADAPTER FOR MOUNTING CABLE HANGERS

(71) Applicant: CommScope Technologies LLC, Hickory, NC (US)

(72) Inventors: Aviral Joshi, Chicago, IL (US); Ronald A. Vaccaro, Taylorsville, NC (US); Christopher Stockman, Bella Vista, AR (US)

( * ) Notice: Subject to any disclaimer, the term of this patent is extended or adjusted under 35 U.S.C. 154(b) by 0 days.

(21) Appl. No.: 16/904,803

(22) Filed: Jun. 18, 2020

(65) Prior Publication Data

US 2020/0321763 A1 Oct. 8, 2020

Related U.S. Application Data

(63) Continuation-in-part of application No. 16/707,437, filed on Dec. 9, 2019.

(60) Provisional application No. 62/784,986, filed on Dec. 26, 2018.

(51) Int. Cl.
| | |
|---|---|
| *H02G 3/32* | (2006.01) |
| *F16B 31/02* | (2006.01) |
| *F16B 2/04* | (2006.01) |
| *H01R 4/36* | (2006.01) |
| *F16B 2/06* | (2006.01) |
| *F16B 35/00* | (2006.01) |
| *B25B 5/00* | (2006.01) |
| *F16B 35/06* | (2006.01) |

(52) U.S. Cl.
CPC .............. *H02G 3/32* (2013.01); *F16B 2/04* (2013.01); *F16B 31/021* (2013.01); *B25B 5/00* (2013.01); *F16B 2/065* (2013.01); *F16B 35/005* (2013.01); *F16B 35/06* (2013.01); *H01R 4/36* (2013.01)

(58) Field of Classification Search
CPC ..... H02G 3/32; F16B 2/04; F16B 2/06; F16B 2/065; F16B 35/005; F16B 35/06; Y10T 4003/7067; B25B 5/00
See application file for complete search history.

(56) References Cited

U.S. PATENT DOCUMENTS

| | | | |
|---|---|---|---|
| 2,915,267 A | 12/1959 | Kaysing | |
| 3,300,930 A | 1/1967 | Weise | |
| 3,341,909 A * | 9/1967 | Havener | ................ B25B 5/101 24/486 |
| 4,118,834 A | 10/1978 | Weidler | |
| 5,286,211 A * | 2/1994 | McIntosh | ................ H01R 4/64 439/100 |
| 6,516,948 B1 | 2/2003 | Caballero | |
| 8,191,836 B2 | 6/2012 | Korczak | |
| 8,534,614 B2 | 9/2013 | Guthke et al. | |

(Continued)

*Primary Examiner* — Tan Le

(74) *Attorney, Agent, or Firm* — Myers Bigel, P.A.

(57) ABSTRACT

An adapter for a cable hanger includes: a housing having a floor, a vertical wall extending generally perpendicularly from the floor, and side walls extending generally perpendicularly from the floor and vertical wall, each of the side walls including a finger extending generally parallel to the floor, the fingers including first engagement features, the vertical wall including a mounting hole; and a plunger having a main panel and second engagement features on opposite sides of the main panel, the second engagement features configured to engage the first engagement features to restrict relative movement of the plunger relative to the housing.

16 Claims, 14 Drawing Sheets

(56) References Cited

U.S. PATENT DOCUMENTS

| | | | |
|---|---|---|---|
| 8,534,625 B2* | 9/2013 | Heath | F16B 2/06 |
| | | | 248/226.11 |
| 8,857,771 B2* | 10/2014 | Streetman | F16L 3/133 |
| | | | 248/72 |
| 9,746,011 B2* | 8/2017 | Jiang | F16B 2/065 |
| 9,835,192 B2* | 12/2017 | Castonguay | H01R 4/36 |
| 9,853,434 B2 | 12/2017 | Vaccaro | |
| 9,866,004 B2 | 1/2018 | Vaccaro et al. | |
| 9,903,510 B2 | 2/2018 | Joshi et al. | |
| 10,578,231 B2 | 3/2020 | Hughes | |
| 2006/0131465 A1 | 6/2006 | Lynch, Jr. et al. | |
| 2018/0045336 A1 | 2/2018 | Vaccaro | |

* cited by examiner

ADAPTER FOR MOUNTING CABLE HANGERS

RELATED APPLICATION

The present application is a continuation-in-part of and claims priority to U.S. patent application Ser. No. 16/707,437, filed Dec. 9, 2019, which claims priority from and the benefit of U.S. Provisional Patent Application No. 62/784,986, filed Dec. 26, 2018, the disclosures of which are hereby incorporated herein by reference in full.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and other structures. Generally, each cable is attached to a structural member by cable hangers mounted at periodically-spaced attachment points.

Antenna towers may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Ill.). Other cable hangers are shown in U.S. patent application Ser. No. 15/081,177, filed Mar. 25, 2016, Ser. No. 15/081,240, filed Mar. 25, 2016, and Ser. No. 15/335,614, filed Oct. 27, 2016, the disclosures of each of which are hereby incorporated herein by reference in full.

Another available stackable cable hanger is discussed in U.S. Patent Publication No. 2018/0045336 to Vaccaro, the disclosure of which is hereby incorporated herein by reference in its entirety. This cable hanger (versions of which are available from CommScope, Inc. under the name SNAPTAK) is formed of a polymeric material and is typically employed for smaller cables. In addition, the polymeric SNAPTAK hanger can reduce or eliminate passive intermodulation (PIM) near an antenna. PIM, which can negatively impact antenna performance, can be caused by a variety of factors, one of which is metal-to-metal interfaces of components near the antenna. Using a polymeric hanger that is mounted on a metallic antenna mount or other structure can eliminate potential PIM that might otherwise be caused by a metal hanger mounted to a metal antenna leg.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three serially-attached mounting panels 14. Each of the mounting panels 14 includes a mounting hole 16 (typically a nominal ¾ inch hole) that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

It may be desirable to provide additional configurations for mounting cable hangers, particularly to structures without pre-formed holes, and particularly in a manner that can reduce or eliminate PIM.

SUMMARY

As a first aspect, embodiments of the invention are directed to an adapter for a cable hanger. The adapter comprises: a housing having a floor, a vertical wall extending generally perpendicularly from the floor, and side walls extending generally perpendicularly from the floor and vertical wall, each of the side walls including a finger extending generally parallel to the floor, the fingers including first engagement features, the vertical wall including a mounting hole; and a plunger having a main panel and second engagement features on opposite sides of the main panel, the second engagement features configured to engage the first engagement features to restrict relative movement of the plunger relative to the housing.

As a second aspect, embodiments of the invention are directed to an adapter for a cable hanger, comprising: a housing comprising a floor, first and second side walls and a ceiling that define an opening, an edge of the opening including first engagement features, the ceiling including a mounting hole, the first side wall including a first aperture and the second side wall including a second aperture; a wheel comprising a generally cylindrical body and second engagement features extending radially outwardly of the body; and a strap with a retaining feature at a first end and a plurality of third engagement features. The strap is routed from the first aperture, around the first side wall, a mounting feature adjacent the floor, and the second side wall, and through the second aperture, the retaining feature retaining the first end of the strap within the opening, the third engagement features of the strap engaging the second engagement features of the wheel to retain a second end of the strap within the opening. The second engagement features of the wheel engage the first engagement features of the housing to prevent relative rotation of the wheel relative to the housing.

As a third aspect, embodiments of the invention are directed to an adapter for a cable hanger comprising: a housing having a floor, a rear wall extending generally perpendicularly from the floor, a ceiling extending generally parallel to the floor, and side walls extending generally perpendicularly from the floor and rear wall, each of the side walls including an open-ended slot generally parallel to the floor, at least one of the floor and the rear wall including a mounting hole, and the ceiling including a threaded opening; and a securing screw having a shank with threads and a head structure, the shank inserted into the threaded opening and having threads that mesh with the threaded opening.

As a fourth aspect, embodiments of the invention are directed to an adapter for a cable hanger comprising: a housing having a floor, a rear wall extending generally perpendicularly from the floor, a ceiling extending generally parallel to the floor, and side walls extending generally perpendicularly from the floor and rear wall, each of the side walls including an open-ended slot generally parallel to the floor, at least one of the floor and the rear wall including a mounting hole, and the ceiling including a threaded opening; and a securing screw formed of a polymeric material and having a shank with threads and a head structure, the shank inserted into the threaded opening and having threads that mesh with the threaded opening, wherein the head structure comprises a lower head attached to the shank, a transition section attached to the lower head, and an upper head attached to the transition section, and wherein the transition section is configured to fracture at a predetermined torque threshold.

As a fifth aspect, embodiments of the invention are directed to a method of mounting an adapter for a cable hanger on a mounting structure comprising the steps of:
  (a) providing an adapter for a cable hanger comprising: a housing having a floor, a rear wall extending generally perpendicularly from the floor, a ceiling extending generally parallel to the floor, and side walls extending generally perpendicularly from the floor and rear wall, each of the side walls including an open-ended slot generally parallel to the floor, at least one of the floor and the rear wall including a mounting hole, and the ceiling including a threaded opening; and a securing screw having a shank with threads and a head structure, the shank inserted into the threaded opening and having threads that mesh with the threaded opening;
  (b) positioning the adapter on a mounting structure so that the mounting structure is received in the opening-ended slots; and
  (c) rotating the securing screw relative to the housing so that a lower end of the securing screw engages the mounting structure.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, an adapter for mounting a cable hanger to a mounting structure, designated broadly at 100, is shown in FIGS. 4-10. The adapter 100 comprises two separate parts: a housing 102 and a plunger 104. These components are described in greater detail below.

Figure 4:
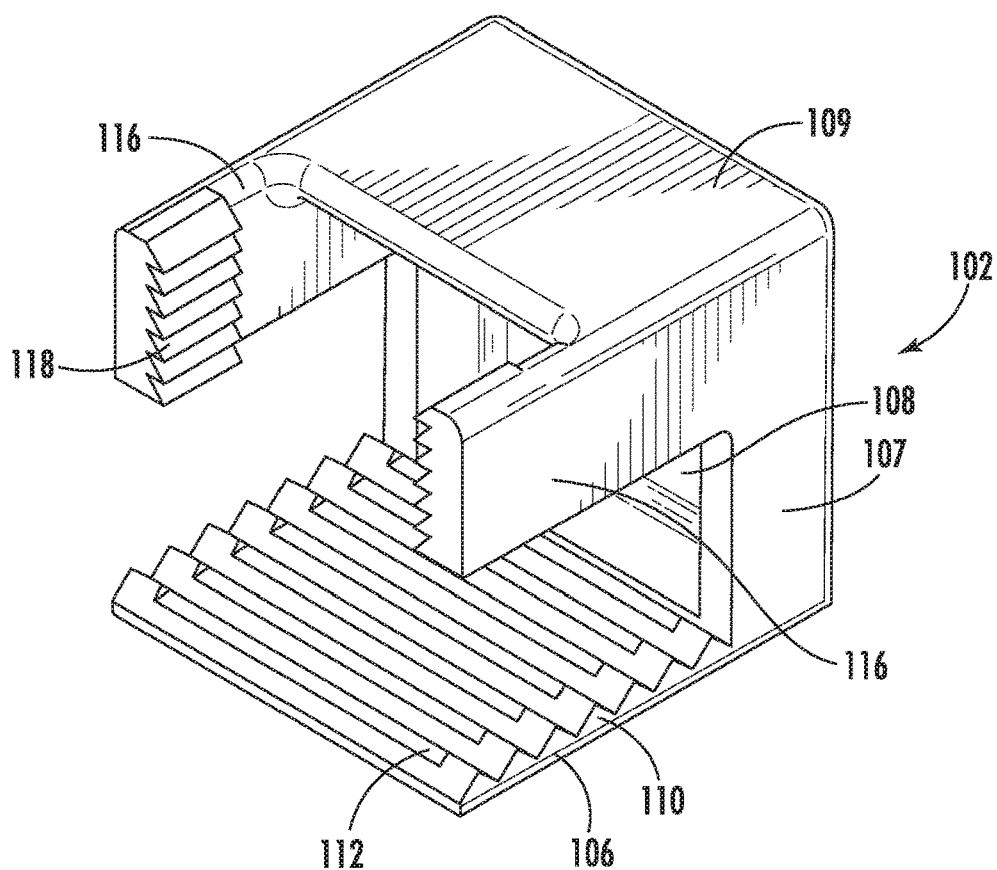
FIG. 4 is a rear perspective view of a housing for an adapter for cable hangers according to embodiments of the invention.
Figure 5:
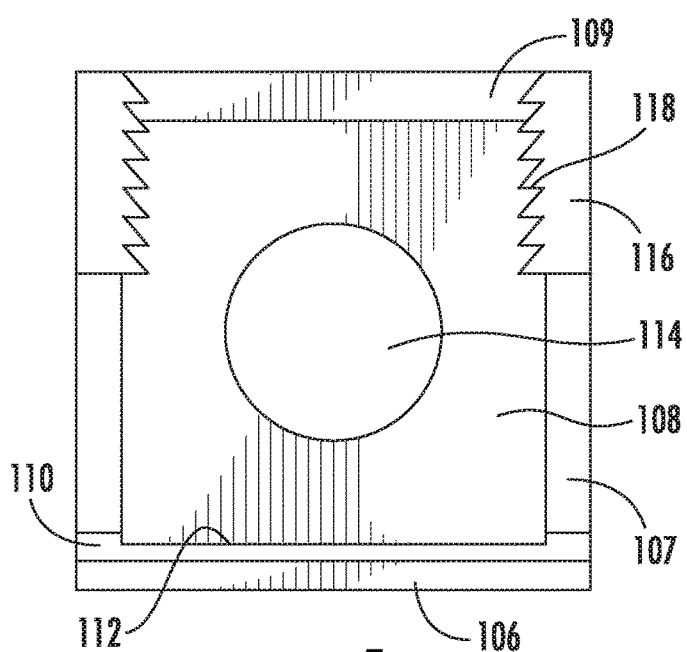
FIG. 5 is a rear view of the housing of FIG. 4.

Referring now to FIGS. 4 and 5, the housing 102 is shown therein. The housing 102 is generally C-shaped in profile, with a base 106, a vertical wall 108 that extends from one end of the base 106, side walls 107 that extend from the side edges of the vertical wall 108, and a ceiling 109 that extends from the end of the vertical wall 108 opposite the base 106 and spans the upper ends of the side walls 107. The base 106 includes a series of teeth 110 that protrude upwardly and extend transversely across the base 106. Each tooth 110 includes a recess 112 that extends for much of the length of the tooth 110. The vertical wall 108 includes a hole 114 (typically nominally ¾ inch in diameter) for the mounting of a cable hanger. Two fingers 116 extend from the upper forward edges of the side walls 107. Each of the fingers 116 includes a series of asymmetric teeth 118 that are more shallowly sloped on their lower edges.

Figure 6:
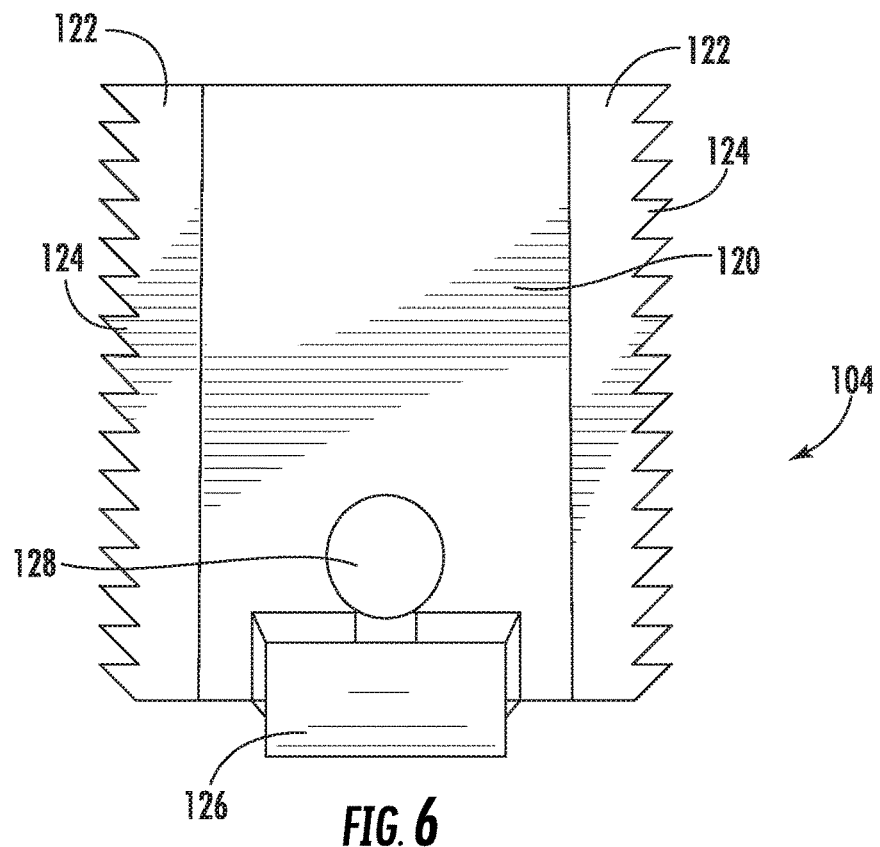
FIG. 6 is a rear view of a plunger used with the housing of FIG. 4.
Figure 7:
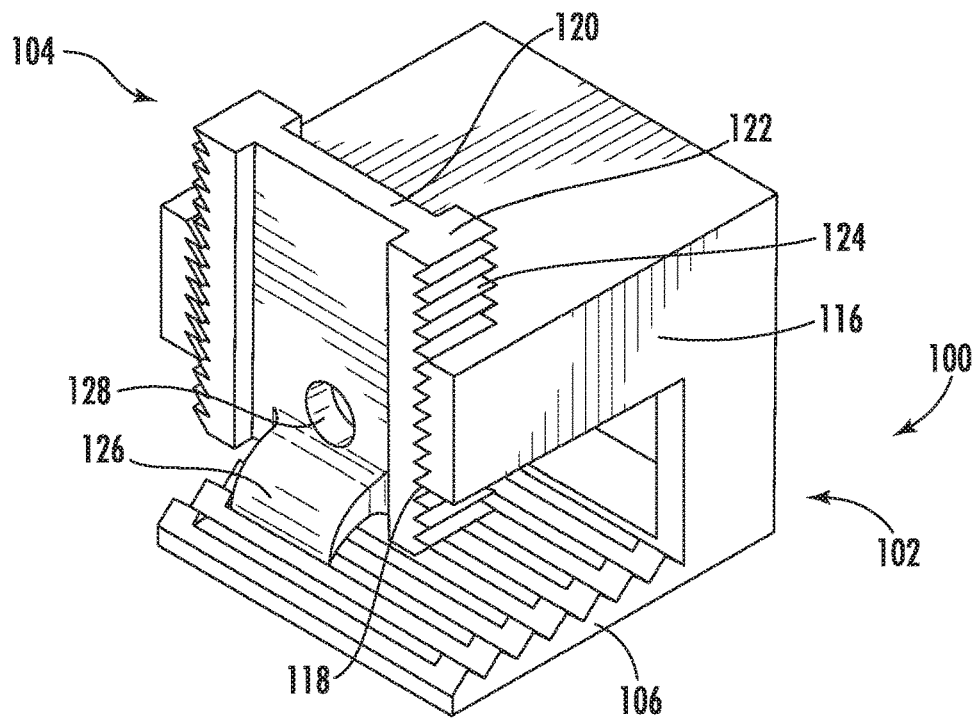
FIG. 7 is a rear perspective view of the housing of FIG. 4 and the plunger of FIG. 6 combined to form an adapter for cable hangers according to embodiments of the invention.
Figure 8:
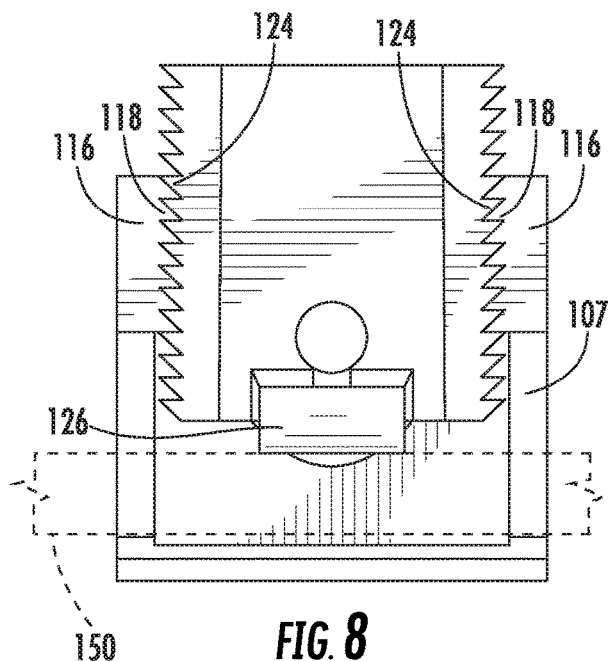
FIG. 8 is a rear view of the adapter of FIG. 7.
Figure 9:
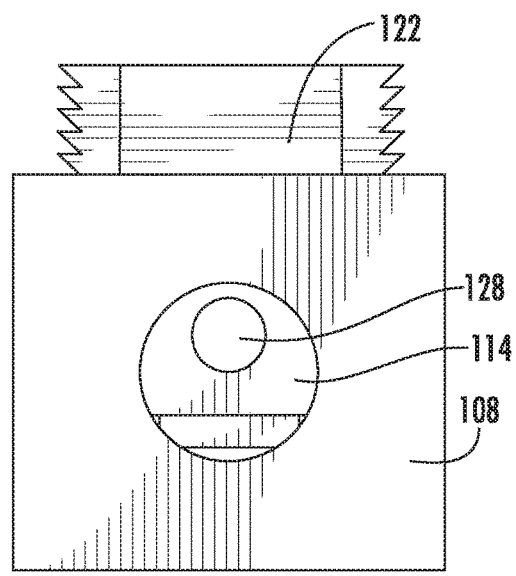
FIG. 9 is a front view of the adapter of FIG. 7.
Figure 10:
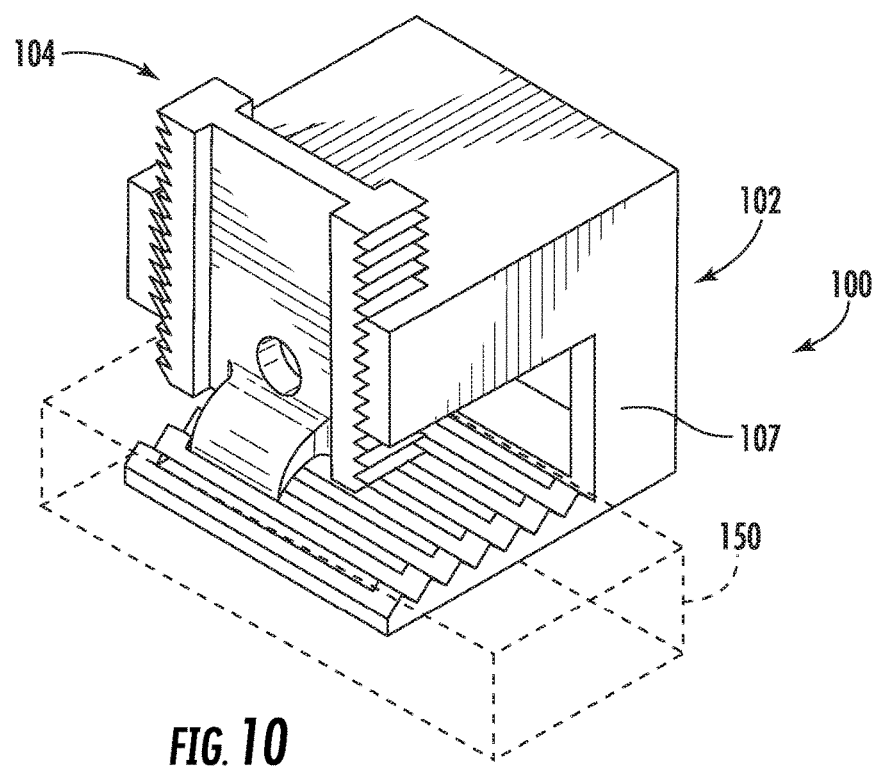
FIG. 10 is a rear perspective view of the adapter of FIG. 7 mounted on the rung of a ladder.

Referring now to FIG. 6, the plunger 104 has a main panel 120. A flange 122 extends perpendicularly to each of the side edges of the main panel 120. Each flange 122 has asymmetric teeth 124 on its lateral surface that are configured to mesh with the teeth 118 of the housing 102. A hook 126 extends from and generally normal to the lower end of the main panel 120, then gently curves below the lower edge of the main panel 120. A leverage hole 128 is located in the main panel 120 near the base of the hook 126.

The housing 102 and plunger 104 can be formed of a variety of materials, but are typically formed of a polymeric material. Exemplary polymeric materials include acetal and nylon 6,6. The housing 102 and plunger 104 may be formed in any suitable manner, but ordinarily are injection-molded. The housing 102 and plunger 104 may be formed of the same material or different materials as desired.

Figure 1:
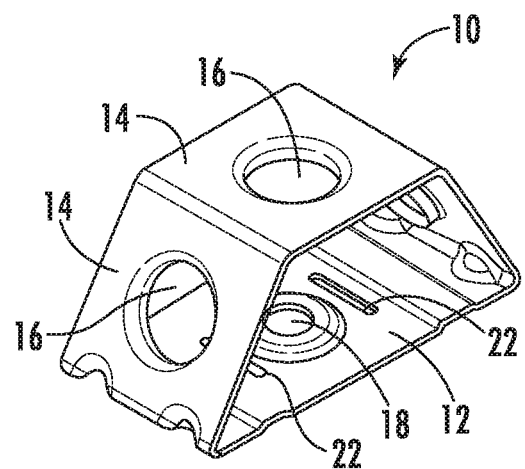
FIG. 1 is a perspective view of a prior art adapter for cable hangers.
Figure 2:
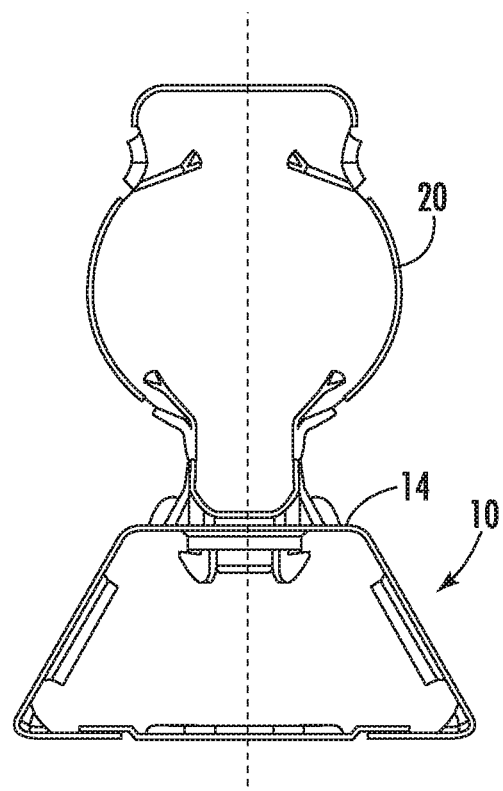
FIG. 2 is a top view of the adapter of FIG. 1 with a cable hanger mounted therein.
Figure 3:
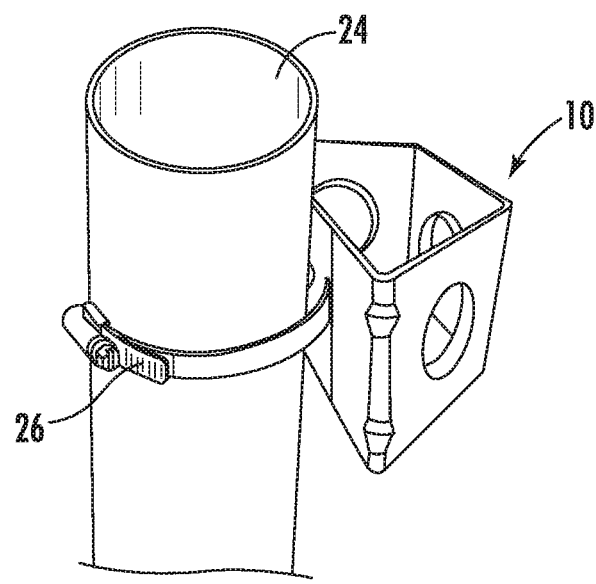
FIG. 3 is a perspective view of the adapter of FIG. 1 mounted to a pole via a hose clamp.

Use of the adapter 100 can be understood from FIGS. 7-10. The housing 102 is first inserted onto a mounting structure, such as a rung 150 of a ladder on an antenna tower (see FIGS. 8 and 10). The housing 102 is positioned on the rung 150 with the base 106 below the rung 150 and the fingers 116 above the rung 150; typically, the rung 150 will also abut the edges of the side walls 107. The plunger 104 is then inserted from above between the fingers 116, such that the teeth 124 on each side of the plunger 104 engage the teeth 118 of the fingers 116, and lowered until the hook 126 engages the upper surface of the rung 150. The shapes of the teeth 118, 124 permit the plunger 104 to be lowered relative to the housing 102 but prevent the plunger 120 from rising relative to the housing 102. Thus, once the plunger 104 is lowered to snugly engage the rung 150, the adapter 100 is mounted firmly to the rung 150. A cable hanger such as that shown in FIG. 2 can be mounted in the hole 114 in the vertical wall 108 of the housing 102 to serve to capture and organize cables.

Notably, lowering of the plunger 104 relative to the housing 102 can be facilitated with the use of a screwdriver or other leverage-type tool. The blade of the screwdriver can be inserted through the hole 114 and into the leverage hole 128 in the plunger 104. The handle of the screwdriver can then be raised to contact the upper edge of the hole 114, which serves as a fulcrum to drive the blade of the screwdriver (and in turn the plunger 104) downwardly. This capability can enable the plunger 104 to fit tightly within the fingers 116, thereby improving the retention of the adapter 100 on the rung 150.

Those of skill in this art will appreciate that other configurations for the housing 102 and plunger 104 may be employed. For example, although teeth 118, 124 are described herein, other engagement features that enable the plunger 104 to be retained in a desired position relative to the housing 102 may be employed. For example, the teeth 118, 124 may be symmetric rather than asymmetric, or one of the sets of teeth may be replaced with a single tooth or ridge. Moreover, the teeth may be replaced with other protrusions and indentions, such as scallops, detents and mating recesses, or the like. In other embodiments, the engagement features may be latches (e.g., on the plunger 104) and receptacles (e.g., on the housing 102). Other variations are also possible.

In addition, the housing 102 and/or plunger 104 may be modified in other ways. For example, the leverage hole 128 in the plunger may be omitted, and a tab or other graspable member may be employed instead to facilitate installation. Moreover, the hook 126 may be omitted, or may be replaced with a different engagement feature, such as a sharpened edge or the like. Other variations may also be suitable.

Referring now to FIGS. 11-15, another adapter for mounting cable hangers, designated broadly at 200, is shown therein. This adapter 200 includes a housing 202, a wheel 204 and a strap 206. These components are described in greater detail below.

Figure 11:
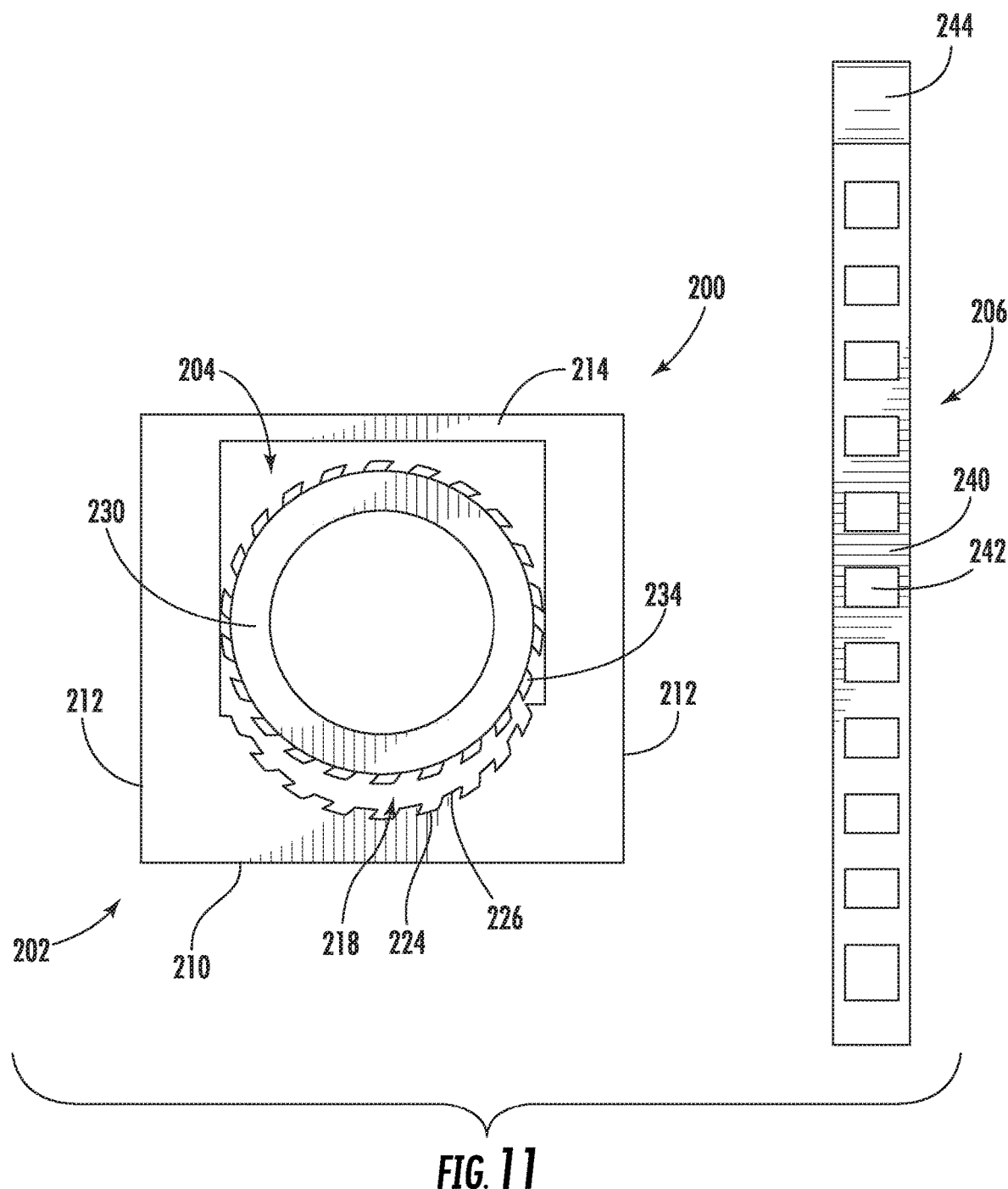
FIG. 11 is a front perspective view of a housing, a wheel and a strap of an adapter for cable hangers according to additional embodiments of the invention.
Figure 12:
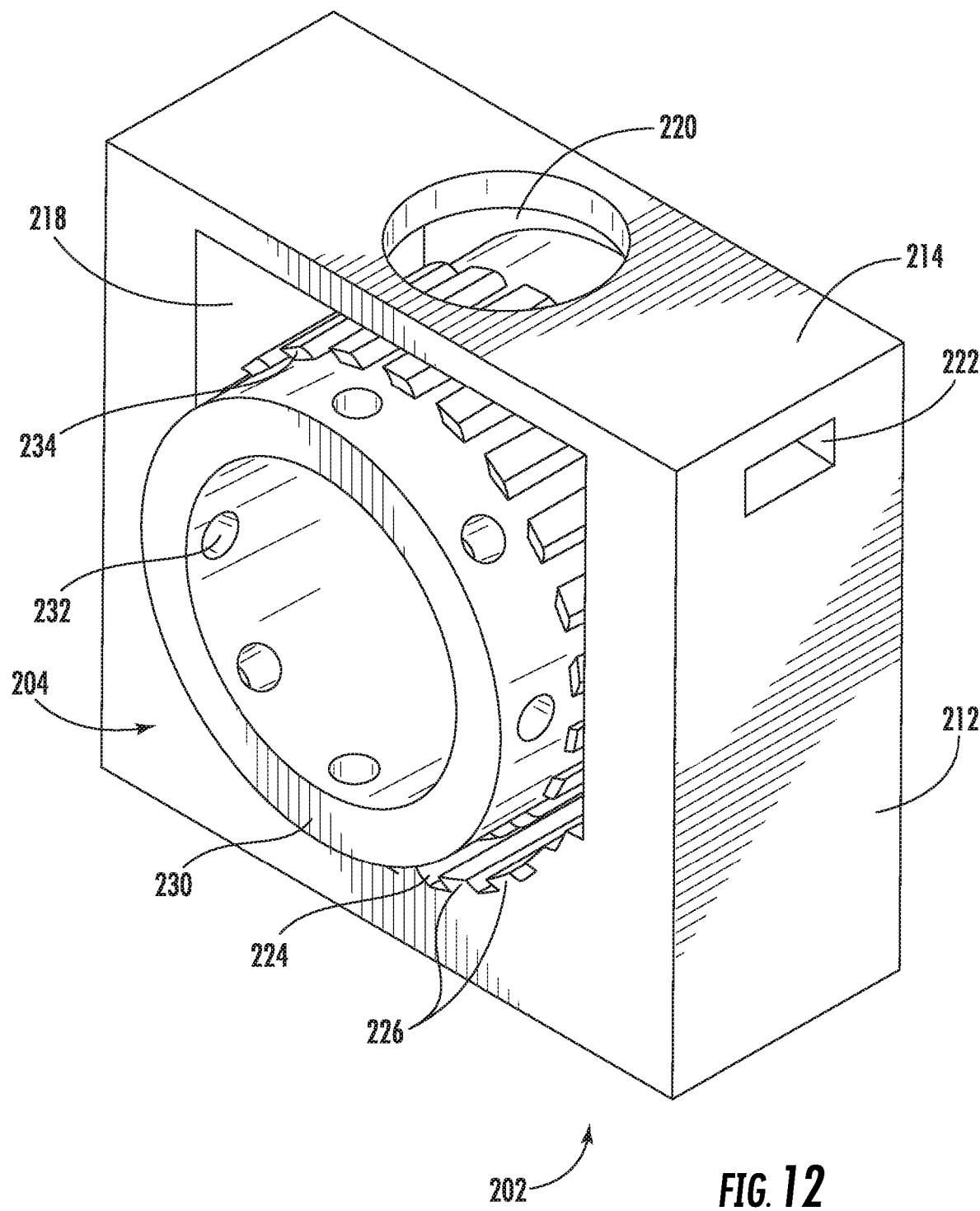
FIG. 12 is a rear perspective view of the housing and wheel of FIG. 11 with the teeth of the wheel engaged with the teeth in the opening of the housing.

Referring to FIGS. 11 and 12, the housing 202 is generally square or rectangular, with a floor 210, side walls 212 and a ceiling 214 that surround an opening 218. The ceiling 214 includes a mounting hole 220 that is typically nominally ¾ inch in diameter. Each of the side walls 212 includes a slot 222 near its upper end. A lower edge 224 of the opening 218 is arcuate and has asymmetric teeth 226 that are inclined toward one of the side walls 212.

The wheel 204 has a generally cylindrical body 230 with a length that is greater than the depth dimension of the housing 202. Near one end, the body 230 includes a plurality of holes 232. At the opposite of the body 230, asymmetric teeth 234 extend radially outwardly, the teeth 230 are configured to mesh with the teeth 226 on the housing 202.

Referring now to FIG. 11, the strap 206 has an elongate body 240 with regularly-spaced rectangular holes 242. The holes 242 are sized to capture the teeth 234 of the wheel 204. A knob 244 is located at one end; the knob 244 is sized to fit through the mounting hole 220 in the ceiling 214 of the housing 202, but to be unable to fit through the slots 222 in the side walls 214. The body 240 of the strap 206 is sized to be able to fit through both of the slots 222.

The housing 202, wheel 204 and strap 206 may be formed of any suitable material, but is typically formed of a polymeric and/or elastomeric materials. Exemplary polymeric materials include acetal and nylon 6,6. The housing 202, wheel 204 and strap 206 may be formed in any suitable manner, but ordinarily are injection-molded. In some embodiments, the housing 202 and wheel 204 may be formed of the same material, and may be injection-molded together as a single unit, with the wheel 204 being attached to the housing 202 via breakaway tabs or the like. The strap 206 is typically formed of a material that is more flexible than that of the housing 202 and wheel 204 to enable it to bend easily.

Figure 13:
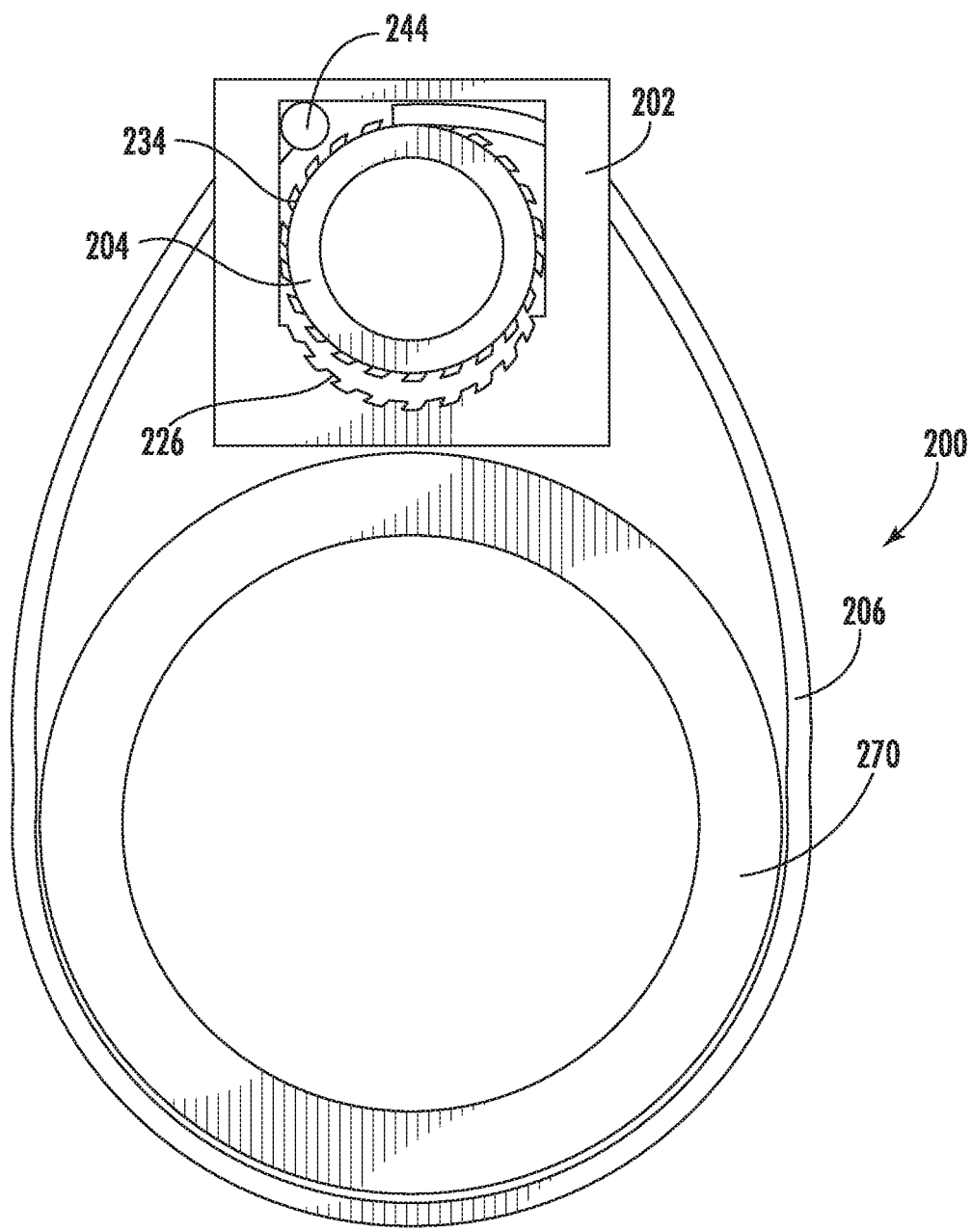
FIG. 13 is a front view of the adapter of FIG. 11 with the strap inserted into the housing and wrapped around a mounting structure.
Figure 14:
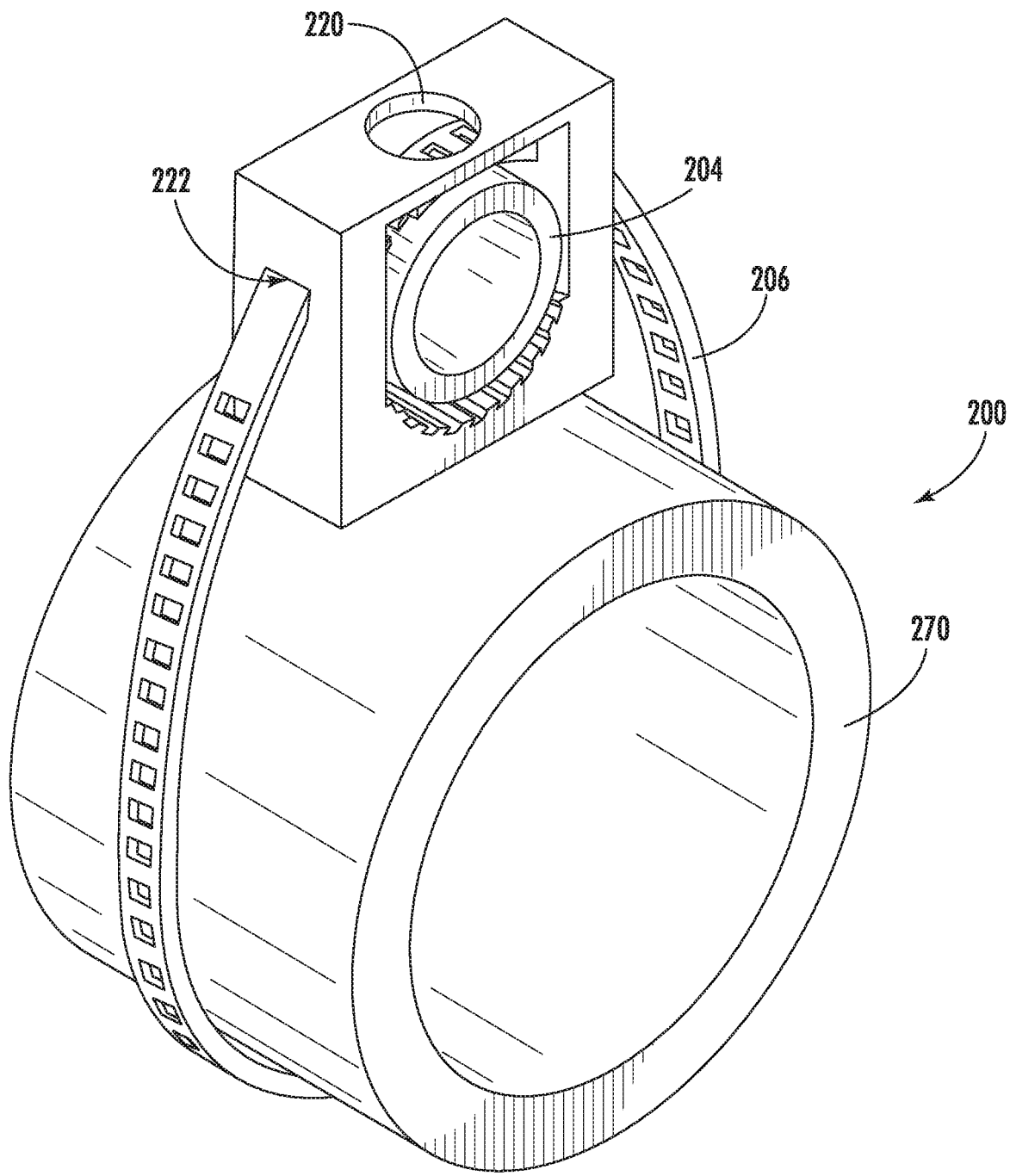
FIG. 14 is a front perspective view of the adapter of FIG. 13 with the strap in place.
Figure 15:
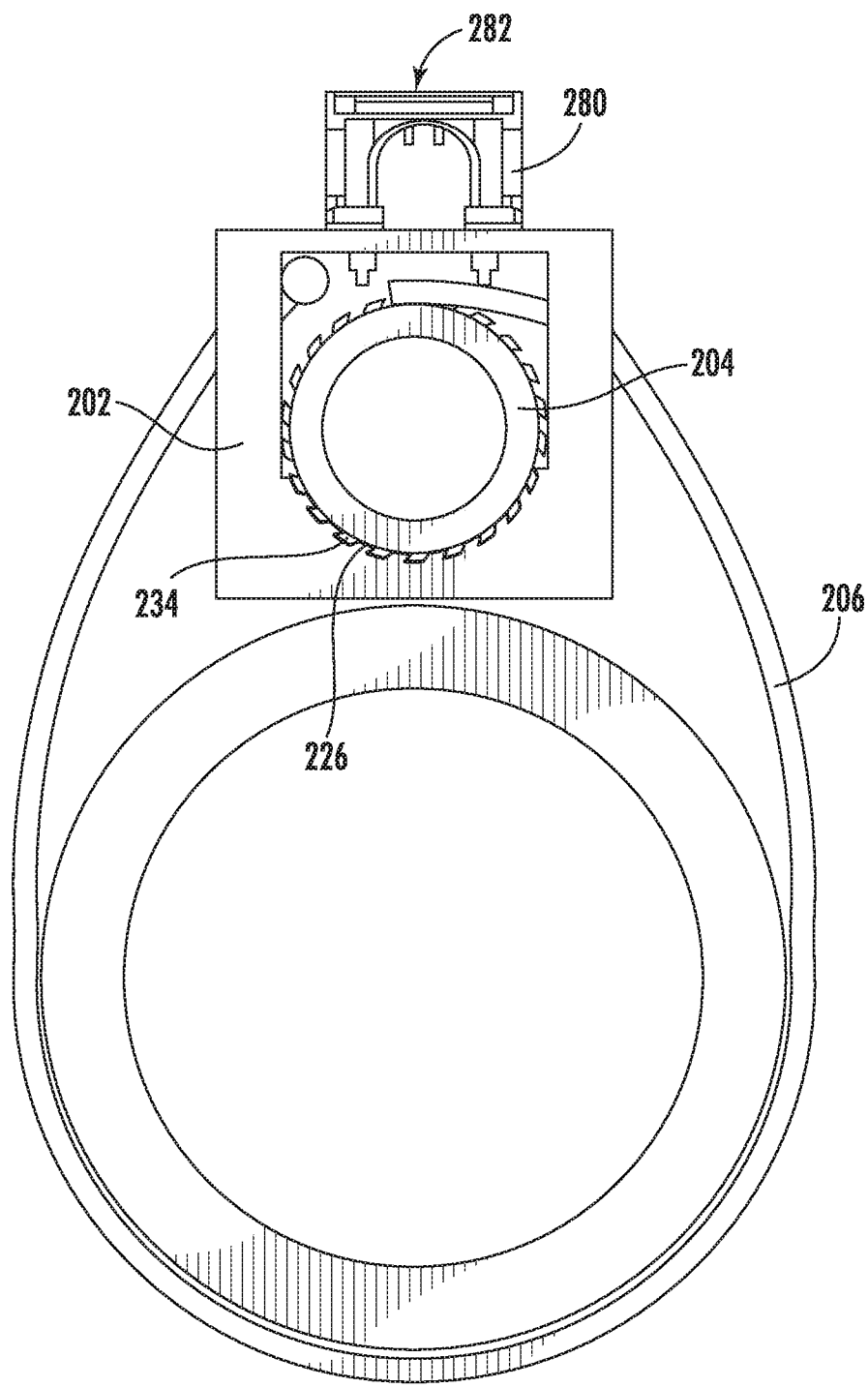
FIG. 15 is a front perspective view of the adapter of FIG. 13 with a cable hanger inserted into the housing to engage the strap and wheel to maintain the adapter in a secured condition.

As can be seen in FIGS. 13-15, the adapter 200 can be mounted to a mounting structure 270, such as a leg of an antenna tower or a monopole, that lacks a pre-formed mounting hole. To mount the adapter 200, first the housing 202 is positioned with the floor 210 resting against the mounting structure 270. The strap 206 is threaded through the mounting hole 220 into the opening 218, through one of the slots 222 and out of the housing 202, along the remainder of the side wall 214, around the mounting structure 270, along the opposite side wall 214, and back into the opening 218 through the opposite slot 222. The wheel 204 is positioned in the opening 218. The strap 206 is tightened somewhat, then laid over the surface of the wheel 204 near the mounting hole 220, with the teeth 234 of the wheel 204 being received in the holes 242 in the strap 206. The wheel 204 is then forced against the lower edge 224 of the opening 218, then rotated relative to the housing 202. The shapes of the teeth 226, 232 enable the wheel 204 to rotate in one rotative direction (e.g., counterclockwise from the vantage point of FIG. 13), but not rotate in the opposite rotative direction. It should be noted that rotation of the wheel 204 can be assisted by inserting a screwdriver or similar tool into one or two of the holes 232 in the wheel 204 to provide leverage.

As shown in FIG. 15, once the strap 206 is tightened sufficiently, the strap 206 can be held in place by inserting a cable hanger 280 into the mounting hole 220. The hooks of the inserted cable holder 280 engage the wheel 204 and/or the strap 206 and force the wheel 204 against the lower edge 224 of the housing 202. As such, the wheel 204 is unable to rotate relative to the housing 202, which prevents the strap 206 from loosening. The mounting hole 282 in the cable hanger 280 is then positioned for the mounting of additional cable hangers adjacent the mounting structure 270.

Those of skill in this art will appreciate that the housing 202, wheel 204 and/or strap 206 may take other forms. For example, features on the housing 202 and wheel 204 that engage and resist movement other than the teeth 226, 232 may be employed. Exemplary alternatives include symmetric teeth on both components, a single tooth or ridge on one component (e.g., the housing 202) and multiple teeth on the other component (e.g., the wheel 204), a system of mating recesses and flexible fingers, or the like. As a further alternative, the housing 202, wheel 204 and strap 206 may include high-friction material (akin to a clutch belt). Other variations may also be suitable.

It is also notable that each of the adapters 100, 200 may be formed of polymeric materials, with the result that cable hangers can be mounted to metallic structures (such as monopoles or antenna tower ladders) that lack mounting holes, and can do so without generating PIM that could otherwise negatively impact antenna performance.

Referring now to FIGS. 16-23, another adapter according to embodiments of the invention is illustrated therein and designated broadly at 300. The adapter comprises a housing 302 and a securing screw 304. These components are discussed in greater detail below.

Figure 16:
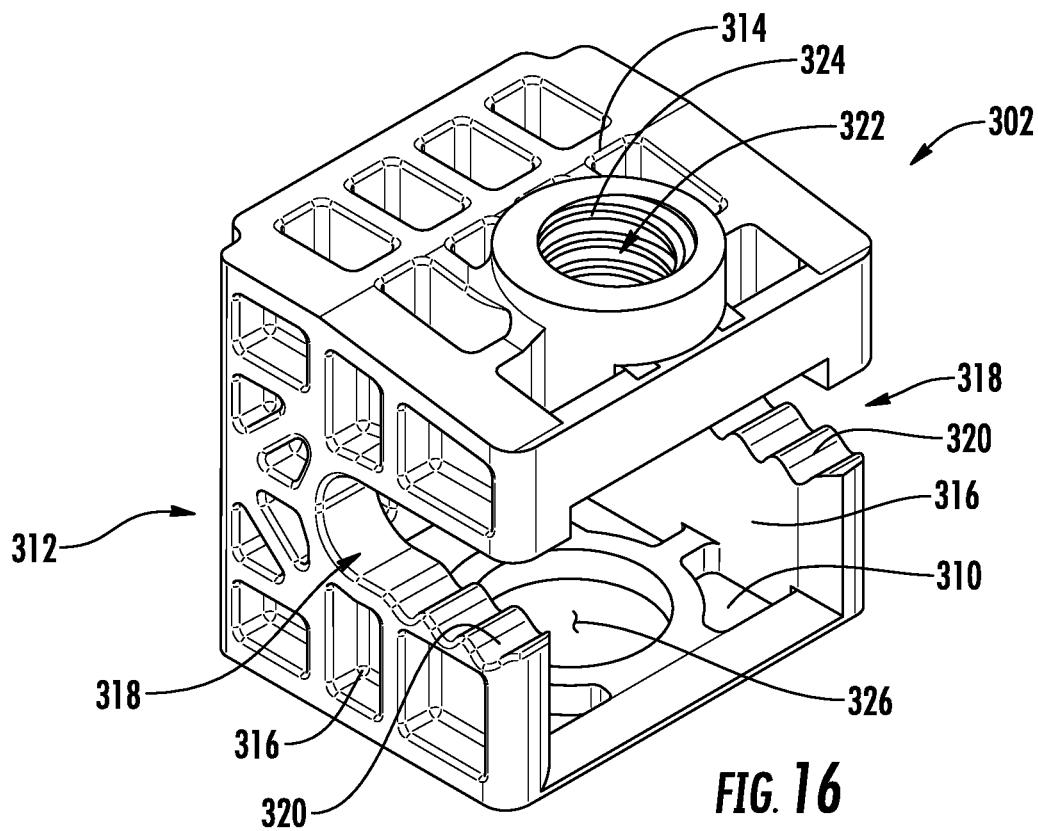
FIG. 16 is a perspective view of a housing of another adapter for a cable hanger according to embodiments of the invention.
Figure 17:
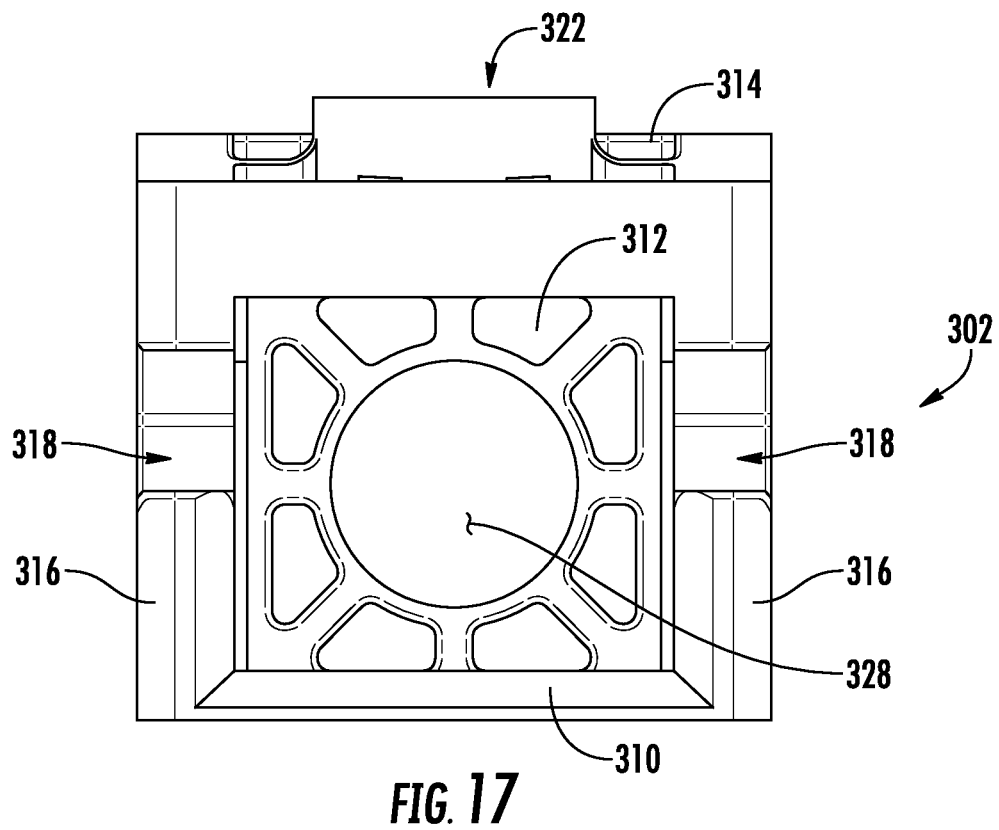
FIG. 17 is a front view of the housing of FIG. 16.

Referring first to FIGS. 16 and 17, the housing 302 includes a floor 310, a rear wall 312, a ceiling 314, and side walls 316. These structures are arranged to form generally a cube with an open front side. Each of the side walls 316 has a slot 318 that is open at its front end. Teeth 320 are present in the lower edge of each slot 318 to improve grip. The ceiling 314 has an opening 322 with threads 324. The floor 310 also has a mounting hole 326. As can be seen in FIG. 17, the rear wall 312 has a mounting hole 328 that is sized and configured to receive a cable hanger in the manner of the adapter 100, 200 above. Typically, the mounting holes 326, 328 have a nominal ¾ inch diameter. Each of the floor 310, rear wall 312, ceiling 314, and side walls 316 has a pattern of ribs that can provide strength and stiffness.

Figure 19:
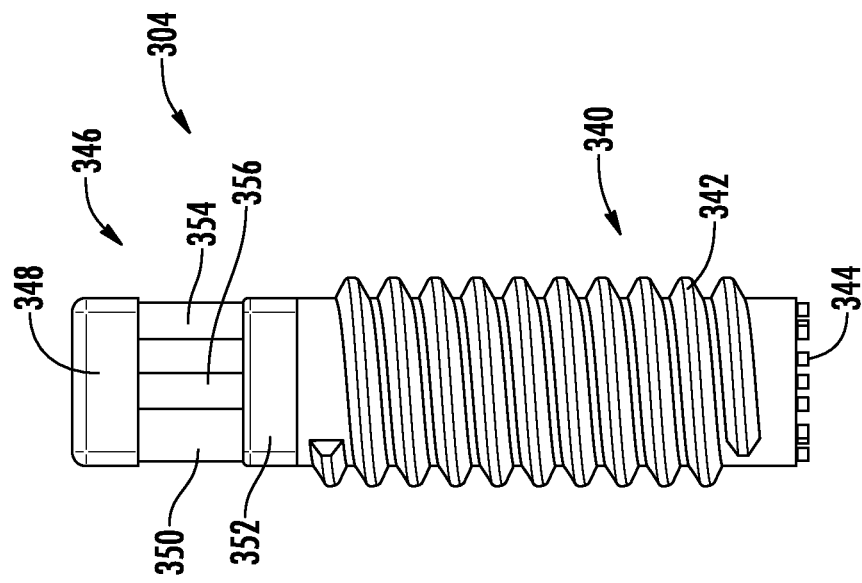
FIG. 19 is a front view of the securing screw of FIG. 18.
Figure 18:
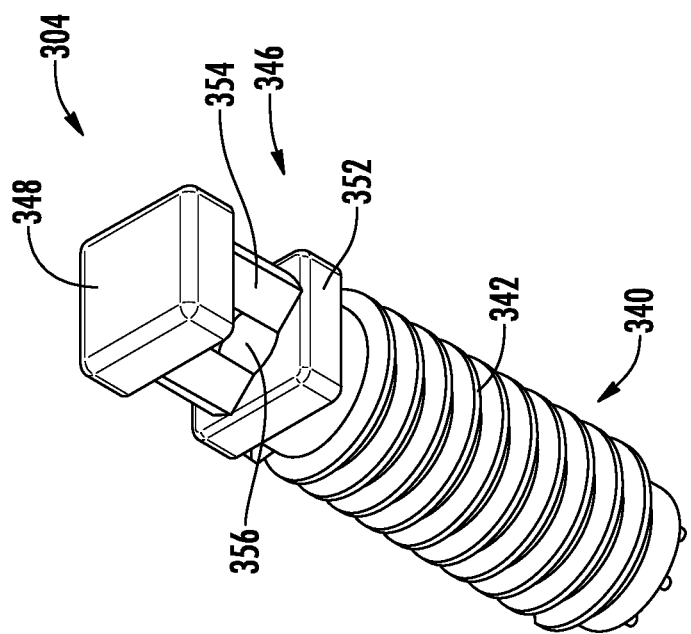
FIG. 18 is a perspective view of a securing screw of the adapter of FIG. 16.

Referring now to FIGS. 18 and 19, the securing screw 304 includes a shank 340 with threads 342 configured to mesh with the threads 324 of the housing 302. The bottom surface of the shank 340 has nubs 344 or some other variety of grip-enhancer (e.g., a roughened surface, teeth, spikes, etc). At its upper end, the securing screw 304 has a compound head structure 346, which includes an upper head 348, a transition section 350, and a lower head 352. The upper and lower heads 348, 352 are configured to receive a rotatable fastening tool (e.g., a wrench) that is used to tighten the screw 304. In the illustrated embodiment, the upper and lower heads 348, 352 have the same shape and size, to permit the same fastening tool to be used on them, but in some embodiments the size and/or shape of the upper and lower heads 348, 352 may differ. The transition section 350 is generally configured as a panel or wall 354 that includes a rib 356 extending between the upper and lower heads 348, 352, although other configurations may also be employed.

Figure 21:
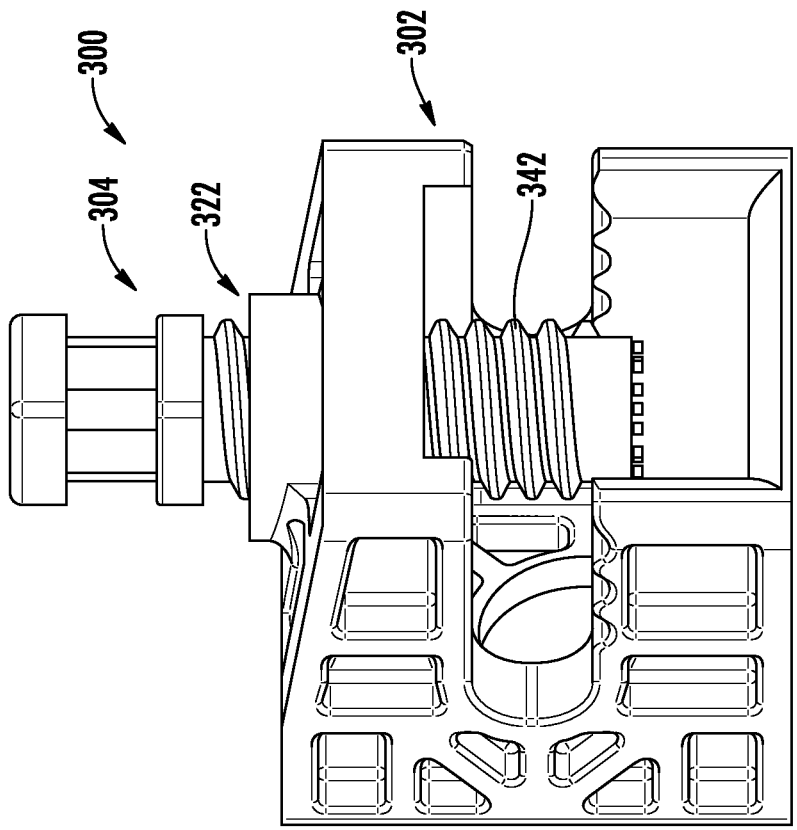
FIG. 21 is a perspective view of the adapter of FIG. 16.
Figure 20:
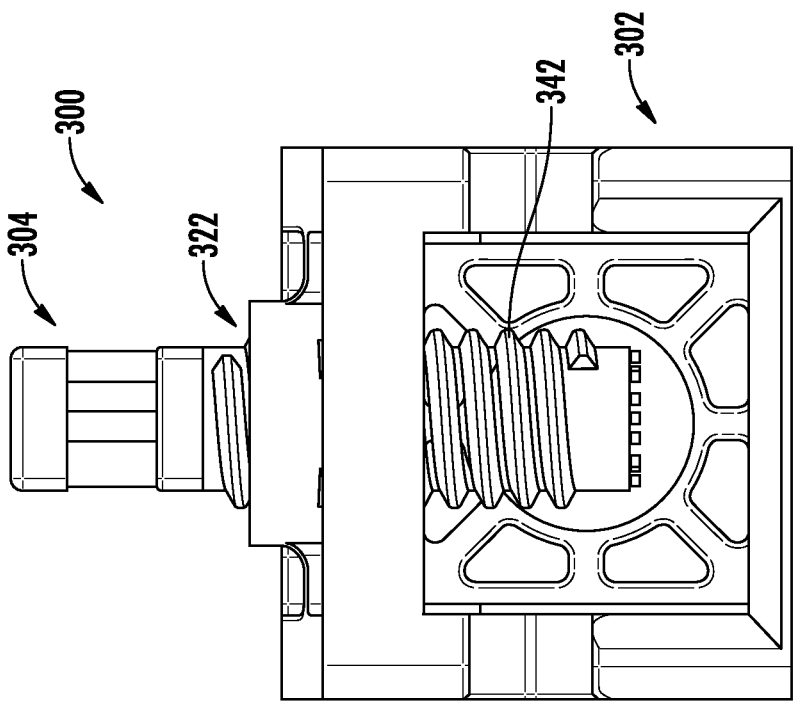
FIG. 20 is a front view of the adapter of FIG. 16.

As can be seen in FIGS. 20 and 21, the securing screw 304 can be inserted into the opening 322 in the ceiling 314 of the housing 302. The threads 324 of the opening 322 mesh with the threads 342 of the screw 304.

Figure 22:
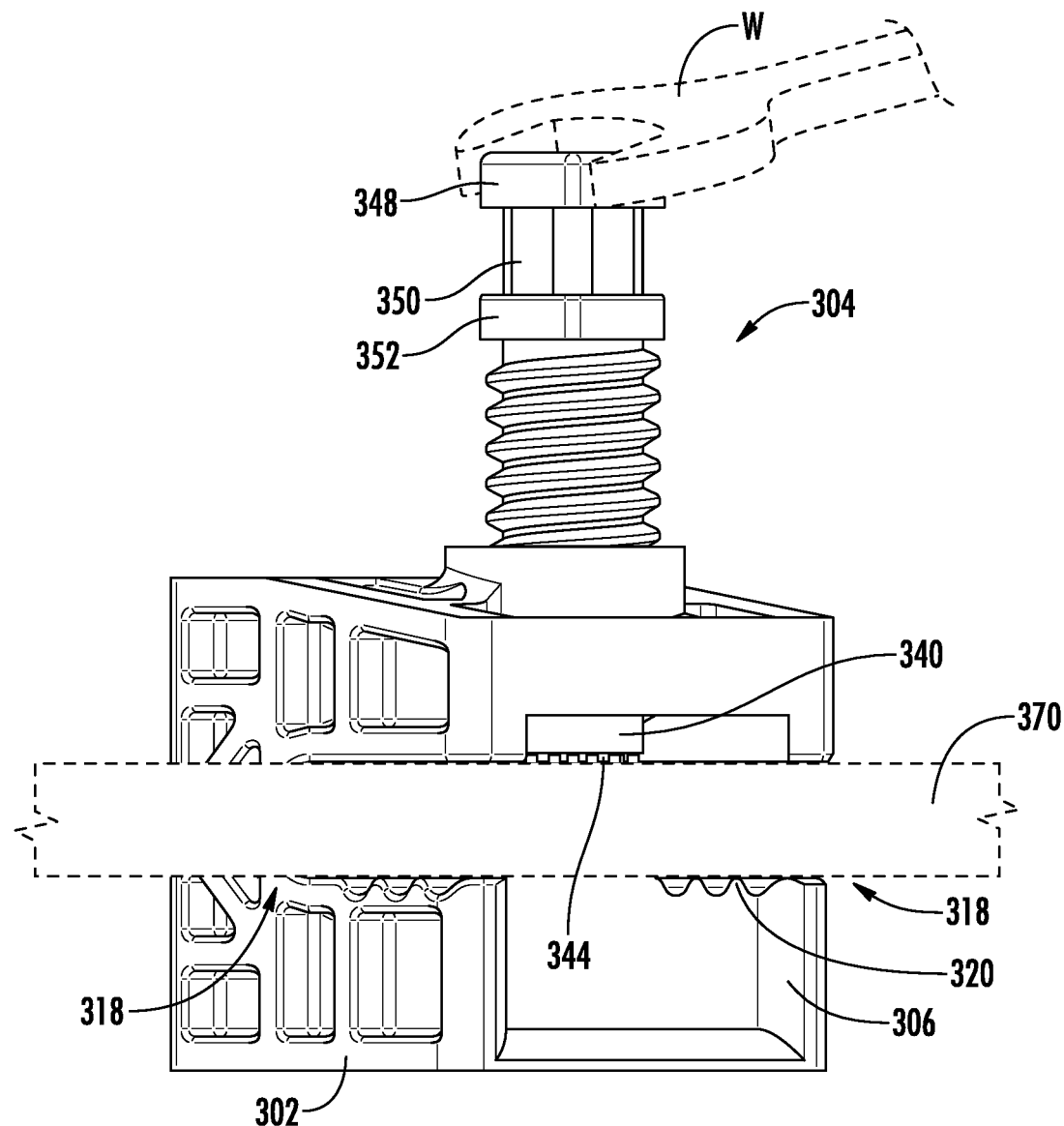
FIG. 22 is a perspective schematic view of the adapter of FIG. 16 mounted on a ladder rung.
Figure 23:
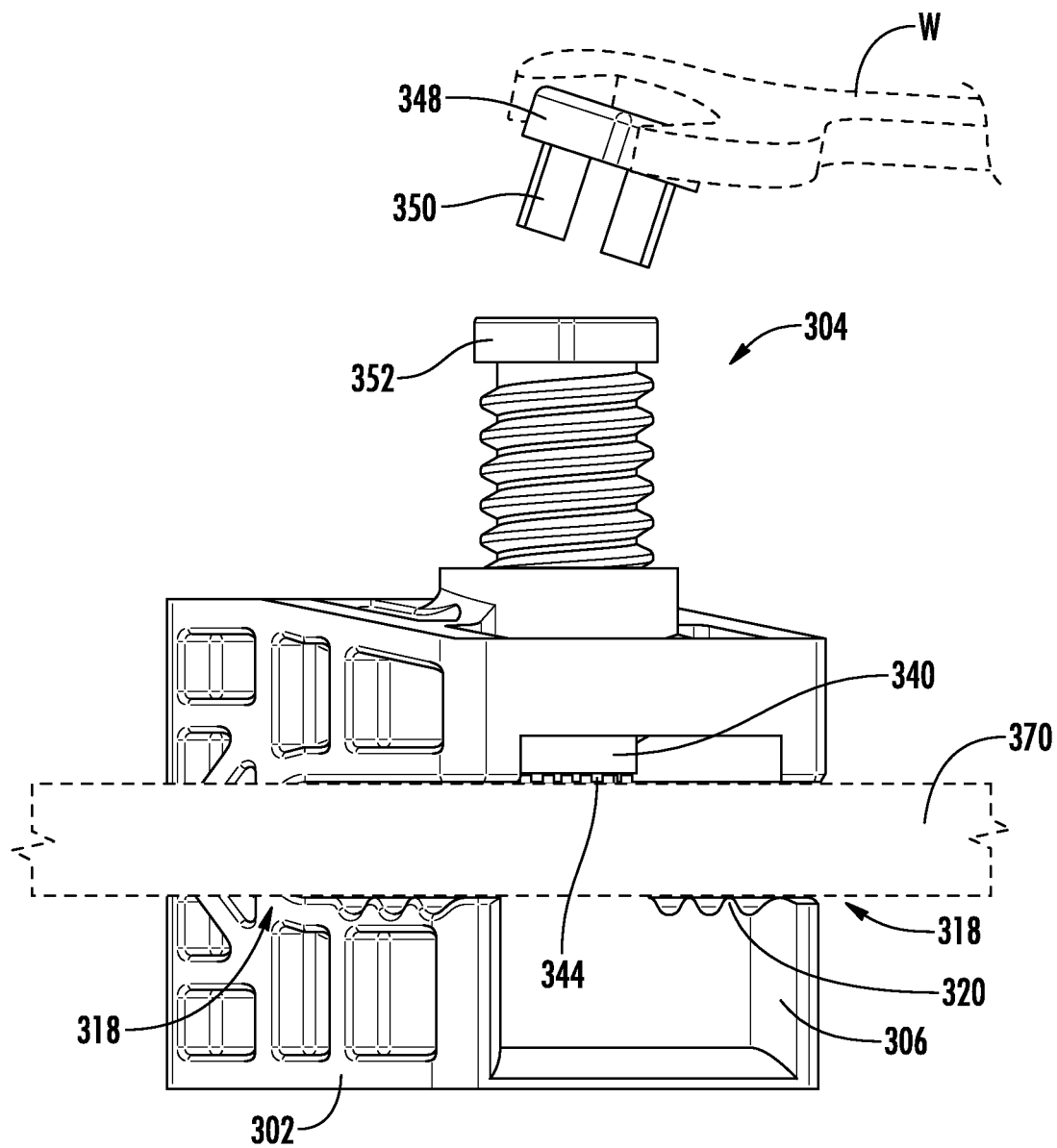
FIG. 23 is a perspective schematic view of the mounted adapter of FIG. 22 with the upper head and transition section of the screw broken off.

Referring now to FIG. 22, the adapter 300 is illustrated mounted on a mounting structure 370, such as the rung of a ladder. The housing 302 of the adapter 300 is attached to the mounting structure 370 by aligning the slots 318 in the side walls 306 of the housing 302 with the mounting structure 370, and slipping the housing 302 onto the mounting structure 370 so that the mounting structure 370 is received in the slots 318. Once the mounting structure 370 is in position in the slots 318, the securing screw 304 is rotated relative to the housing 302 to cause it to advance onto the mounting structure 370. Movement of the securing screw 370 ceases when the lower end of the shaft 340 engages the surface of the mounting structure 370 (see FIG. 21). At this point a cable hanger can be mounted in either of the mounting holes 326, 328.

Once the shaft 340 engages the mounting structure 370, continued rotation of the securing screw 304 tightens the screw 304 in place. Typically, there exists a lower threshold pressure for securing the adapter 300 onto the mounting structure 370, which may be generated via a corresponding threshold torque on the securing screw 304. Overtightening the securing screw 304 beyond a second, higher threshold pressure raises the risk of damaging the housing 302 or the securing screw 304. Ordinarily, a wrench W or other fastening tool (see FIG. 22) is employed to rotate and advance the screw 304 via engagement with the upper head 348. The configuration of the securing screw 304 is such that, once the second, upper threshold torque is reached (e.g., 3-5 ft-lbs), the transition section 350 of the securing screw 340 fractures, so that the upper head 348 breaks away from the remainder of the securing screw 340 (see FIG. 23). As a result, the screw 304 is installed and engages the mounting structure 370 at the desired pressure.

As one example, if the securing screw 304 is formed of a polymeric material such as acetal or polyethylene, and if the transition section has a height of 8 mm, a width of 5.7 mm and a thickness of 3.8 mm with ribs having a depth of 5.7 mm, the resulting torque to fracture is typically between about 3 and 5 N-m.

It should also be noted that the presence of the nubs 344 on the lower end of the shaft 340 of the securing screw 304 can improve the grip of the screw 304 on the mounting structure 370. In addition, the presence of the teeth 320 in the slots 318 can improve the grip of the housing 302 on the mounting structure. 370.

Like the adapters 100, 200, because the adapter 300 may be formed of polymeric materials, cable hangers can be mounted to metallic structures (such as monopoles or antenna tower ladders) that lack mounting holes, and can do so without generating PIM that could otherwise negatively impact antenna performance.

The foregoing is illustrative of the present invention and is not to be construed as limiting thereof. Although exemplary embodiments of this invention have been described, those skilled in the art will readily appreciate that many That which is claimed is:

1. An adapter for a cable hanger, comprising:
a housing having a floor, a rear wall extending generally perpendicularly from the floor, a ceiling extending generally parallel to the floor, and side walls extending generally perpendicularly from the floor and rear wall, each of the side walls including an open-ended slot generally parallel to the floor, at least one of the floor and the rear wall including a mounting hole, and the ceiling including a threaded opening; and
a securing screw having a shank with threads and a head structure, the shank inserted into the threaded opening and having threads that mesh with the threaded opening;
wherein the head structure comprises a lower head attached to the shank, a transition section attached to the lower head, and an upper head attached to the transition section; and
wherein the transition section comprises a panel and at least one support rib extending generally parallel to the shank.

2. The adapter defined in claim 1, wherein the securing screw is formed of a polymeric material.

3. The adapter defined in claim 1, wherein the transition section is configured to fracture at a predetermined torque threshold.

4. The adapter defined in claim 3, wherein the predetermined torque threshold is between about 3 and 5 N·m.

5. The adapter defined in claim 1, in combination with a cable hanger mounted in the mounting hole.

6. The adapter defined in claim 1, in combination with a mounting structure received in the open ended slots, wherein a lower end of the shank engages the mounting structure.

7. The combination defined in claim 6, wherein the mounting structure is a ladder rung.

8. An adapter for a cable hanger, comprising:
a housing having a floor, a rear wall extending generally perpendicularly from the floor, a ceiling extending generally parallel to the floor, and side walls extending generally perpendicularly from the floor and rear wall, each of the side walls including an open-ended slot generally parallel to the floor, at least one of the floor and the rear wall including a mounting hole, and the ceiling including a threaded opening; and
a securing screw formed of a polymeric material and having a shank with threads and a head structure, the shank inserted into the threaded opening and having threads that mesh with the threaded opening, wherein the head structure comprises a lower head attached to the shank, a transition section attached to the lower head, and an upper head attached to the transition section, and wherein the transition section is configured to fracture at a predetermined torque threshold;
wherein the transition section comprises a panel and at least one support rib extending generally parallel to the shank.

9. The adapter defined in claim 8, wherein the predetermined torque threshold is between about 3 and 5 N·m.

10. The adapter defined in claim 8, in combination with a cable hanger mounted in the mounting hole.

11. The adapter defined in claim 8, in combination with a mounting structure received in the open ended slots, wherein a lower end of the shank engages the mounting structure.

12. A method of mounting an adapter for a cable hanger on a mounting structure, comprising the steps of:
(a) providing an adapter for a cable hanger comprising:
a. a housing having a floor, a rear wall extending generally perpendicularly from the floor, a ceiling extending generally parallel to the floor, and side walls extending generally perpendicularly from the floor and rear wall, each of the side walls including an open-ended slot generally parallel to the floor, at least one of the floor and the rear wall including a mounting hole, and the ceiling including a threaded opening; and
b. a securing screw having a shank with threads and a head structure, the shank inserted into the threaded opening and having threads that mesh with the threaded opening, wherein the head structure comprises a lower head attached to the shank, a transition section attached to the lower head, and an upper head attached to the transition section, and wherein the transition section comprises a panel and at least one support rib extending generally parallel to the shank;
(b) positioning the adapter on a mounting structure so that the mounting structure is received in the opening-ended slots; and
(c) rotating the securing screw relative to the housing so that a lower end of the securing screw engages the mounting structure.

13. The method defined in claim 12, wherein the rotating step comprises applying a fastening tool to the upper head.

14. The method defined in claim 13, wherein the rotating step comprised rotating the securing screw until a predetermined torque threshold is reached that causes the upper head to fracture from the lower head.

15. The method defined in claim 12, wherein the securing screw is formed of a polymeric material.

16. The adapter defined in claim 15, wherein the predetermined torque threshold is between about 3 and 5 N·m.

* * * * *